United States Patent
Chiu et al.

(10) Patent No.: US 9,348,204 B2
(45) Date of Patent: May 24, 2016

(54) LIGHT SOURCE MODULE WITH WAVELENGTH CONVERSION MODULE AND PROJECTION APPARATUS

(71) Applicants: Hao-Wei Chiu, Hsin-Chu (TW); Chi-Hsun Wang, Hsin-Chu (TW); Ko-Shun Chen, Hsin-Chu (TW)

(72) Inventors: Hao-Wei Chiu, Hsin-Chu (TW); Chi-Hsun Wang, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 112 days.

(21) Appl. No.: 14/254,902

(22) Filed: Apr. 17, 2014

(65) Prior Publication Data
US 2014/0362349 A1    Dec. 11, 2014

(30) Foreign Application Priority Data
Jun. 8, 2013   (CN) .......................... 2013 1 0227327

(51) Int. Cl.
G03B 21/20    (2006.01)
G03B 33/08    (2006.01)
H04N 9/31     (2006.01)

(52) U.S. Cl.
CPC .............. *G03B 21/204* (2013.01); *G03B 33/08* (2013.01); *H04N 9/3114* (2013.01); *H04N 9/3158* (2013.01); *H04N 9/3161* (2013.01)

(58) Field of Classification Search
CPC ................. G03B 21/204; G03B 33/08; G03B 2205/003; H04N 9/3114; H04N 5/7458; H04N 9/3158; H04N 1/1937; H04N 9/3161; H04N 13/0427; H04N 2209/043
See application file for complete search history.

(56) References Cited

U.S. PATENT DOCUMENTS

| | | |
|---|---|---|
| 2005/0057145 A1 | 3/2005 | Shieh et al. |
| 2010/0245776 A1 | 9/2010 | Yamamoto |
| 2012/0075591 A1* | 3/2012 | Ogura ................. G03B 21/204 353/31 |
| 2013/0100420 A1* | 4/2013 | Ferri .................... G03B 21/204 353/31 |

FOREIGN PATENT DOCUMENTS

| | | |
|---|---|---|
| CN | 102155639 | 8/2011 |
| CN | 102393598 | 3/2012 |

(Continued)

OTHER PUBLICATIONS

"Office Action of European Counterpart Application", issued on Oct. 21, 2014, p. 1-p. 6.

(Continued)

*Primary Examiner* — Sultan Chowdhury
*Assistant Examiner* — Magda Cruz
(74) *Attorney, Agent, or Firm* — Jianq Chyun IP Office

(57) ABSTRACT

A light source module including an exciting light source, a wavelength conversion module, and a light combining unit is provided. The exciting light source is capable of providing an exciting light beam. The wavelength conversion module includes at least one wavelength conversion reflecting portion and a wavelength conversion portion which cut into the transmission path of the exciting light beam alternately. When the wavelength conversion portion cuts into the transmission path of the exciting light beam, part of the exciting light beam which passes through the wavelength conversion portion is a first color light beam and another part of the exciting light beam is converted into a second color light beam by the wavelength conversion portion. The color of the second color light beam is different from that of the exciting light beam. A projection apparatus is also provided.

20 Claims, 5 Drawing Sheets

(56) References Cited

FOREIGN PATENT DOCUMENTS

| CN | 103052841 | 4/2013 |
|---|---|---|
| EP | 2360523 | 8/2011 |
| JP | 2011128521 | 6/2011 |
| JP | 2011209555 | 10/2011 |
| TW | 201319718 A1 * | 5/2013 ............ G03B 21/14 |

OTHER PUBLICATIONS

"Office Action of China Counterpart Application", issued on Jul. 29, 2015, p. 1-p. 9.

* cited by examiner

LIGHT SOURCE MODULE WITH WAVELENGTH CONVERSION MODULE AND PROJECTION APPARATUS

CROSS-REFERENCE TO RELATED APPLICATION

This application claims the priority benefit of China application serial no. 201310227327.8, filed on Jun. 8, 2013. The entirety of the above-mentioned patent application is hereby incorporated by reference herein and made a part of this specification.

BACKGROUND

1. Field of the Invention

The invention is directed to an optical module and an optical apparatus and more particularly, to a light source module and a projection apparatus.

2. Description of Related Art

Nowadays, projection apparatuses based on a solid-state light source, such as a light-emitting diode (LED) or a laser diode gradually play an important role in the market. A laser diode has luminance efficiency approximately higher than 20%, and thus, in order to breakthrough the limitation to the LED light source, a pure color light source for a projector, which is produced by a laser light source exciting phosphor, is gradually developed. Moreover, a laser projection apparatus may not only allow the laser light source to emit light by exciting the phosphor but also use the laser as a direct light source of the projector. Besides, the laser projection apparatuses have an advantage of adjusting the number of light sources based on brightness requirements to meet various demands on the different brightness rank of projector. Therefore, a projector structure using the laser light source as a light source module has a great potential for replacing the conventional type using the high pressure mercury lamp as a light source and accordingly, become the light source used in a new generation mainstream projector.

However, the laser light source is monochromatic, in other words, its light radiation has a narrower band. Thus, the light emitted by the laser light source is a monochromatic light in the color coordinates approaching the outer boundary of a horseshoe map of the CIE1931 space. Also, the current laser light source has limited selectable bands which result in limited selection of the pure colors and a challenge to meet usage demands of colors if a laser light source is to be adopted as a direct light source in a projector illumination system for achieving light mixing.

U.S. patent publication No. 20100245776 discloses a projector illumination system. U.S. patent publication No. 20050057145 discloses a white light emission means.

SUMMARY

The invention provides a light source module having a good spectrum.

The invention provides a projection apparatus having a projected image with favorable color performance.

Other objectives, features and advantages of the invention will be further understood from the further technical features disclosed by the embodiments of the invention.

To achieve one of, a part of or all of the above-mentioned advantages, or to achieve other advantages, an embodiment of the invention provides a light source module. The light source module includes an exciting light source unit, a wavelength conversion module and a light combining unit. The exciting light source unit is configured to provide an exciting light beam. The wavelength conversion module includes at least one wavelength conversion reflecting portion and a wavelength conversion transmitting portion. The at least one wavelength conversion reflecting portion and the wavelength conversion transmitting portion alternately cut into a transmission path of the exciting light beam. When the wavelength conversion transmitting portion cuts into the transmission path of the exciting light beam, a part of the exciting light beam passing through the wavelength conversion transmitting portion is a first color light beam, and another part of the exciting light beam is converted into a second color light beam by the wavelength conversion transmitting portion. When cutting into the transmission path of the exciting light beam, the at least one wavelength conversion reflecting portion converts and reflects the exciting light beam into at least one converted reflection light beam, and the second color light beam, the converted reflection light beam and the exciting light beam have different colors from one another. The light combining unit is disposed on transmission paths of the first color light beam, the second color light beam and the converted reflection light beam and combines the first color light beam, the second color light beam and the converted reflection light beam as an illumination light beam.

To achieve one of, a part of or all of the above-mentioned advantages, or to achieve other advantages, an embodiment of the invention provides a projection apparatus. The projection apparatus includes the aforementioned light source module, a light valve and a projection lens. The light valve is disposed on a transmission path of the illumination beam and converts the illumination light beam into an image light beam. The projection lens is disposed on a transmission path of the image light beam.

In an embodiment of the invention, the wavelength conversion transmitting portion further includes a substrate, an anti-reflection layer and a phosphor layer. The substrate includes a first surface and a second surface that are opposite to each other. The anti-reflection layer is located on the first surface. The phosphor layer is coated on the second surface of the substrate. A part of the exciting light beam sequentially passes through the anti-reflection layer, the substrate and the phosphor layer.

In an embodiment of the invention, the wavelength conversion transmitting portion further includes a plurality of scattering microstructures located between the substrate and the phosphor layer.

In an embodiment of the invention, the wavelength conversion transmitting portion further includes a plurality of scattering microstructures distributed inside the substrate.

In an embodiment of the invention, the light combining unit is also disposed on the transmission path of the exciting beam and located between the exciting light source unit and the wavelength conversion module.

In an embodiment of the invention, the second color beam includes a first sub light beam and a second sub light beam. The first sub light beam is transmitted to the light combining unit along a first direction. The second sub light beam is transmitted along a second direction and then transmitted to the light combining unit through a light transmitting module, and the first direction is opposite to the second direction.

In an embodiment of the invention, each of the first sub light beam and the second sub light beam has a first band and a second band. The light combining unit combines the first band part of the first sub light beam with the first color light beam and combines the second band part of the second sub light beam with the first color light beam.

In an embodiment of the invention, the light combining unit is a dichroic mirror or a dichroic prism.

In an embodiment of the invention, the at least one wavelength conversion reflecting portion are a plurality of wavelength conversion reflecting portions. The wavelength conversion transmitting portion and the plurality of wavelength conversion reflecting portions alternately cut into the transmission path of the exciting light beam, and at least part of the converted reflection light beams respectively converted and reflected from the exciting light beam by the wavelength conversion reflecting portions have different colors.

In an embodiment of the invention, the exciting light source unit is a laser light source, and the exciting light beam is a laser beam.

Based on the description above, the embodiments of the invention may achieve at least one of the following advantages or effects. In the embodiments of the invention, by means of the wavelength conversion module operating with the light combining unit, the light source module and the projection apparatus may convert a part of the exciting light beam into the second color light beam and the light combining unit combines the first color light beam with the second color light beam as a beam having a color that is more suitable for demands so as to achieve a modulation effect of pure color. In this way, the light source module according to the embodiments of the invention may have a good spectrum and the projection apparatus according to the embodiments of the invention may have a projected image with favorable color performance.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the figures being described. Thus, the directional terminology is used for purposes of illustration and constructs no limitations to the present invention.

Figure 1A:
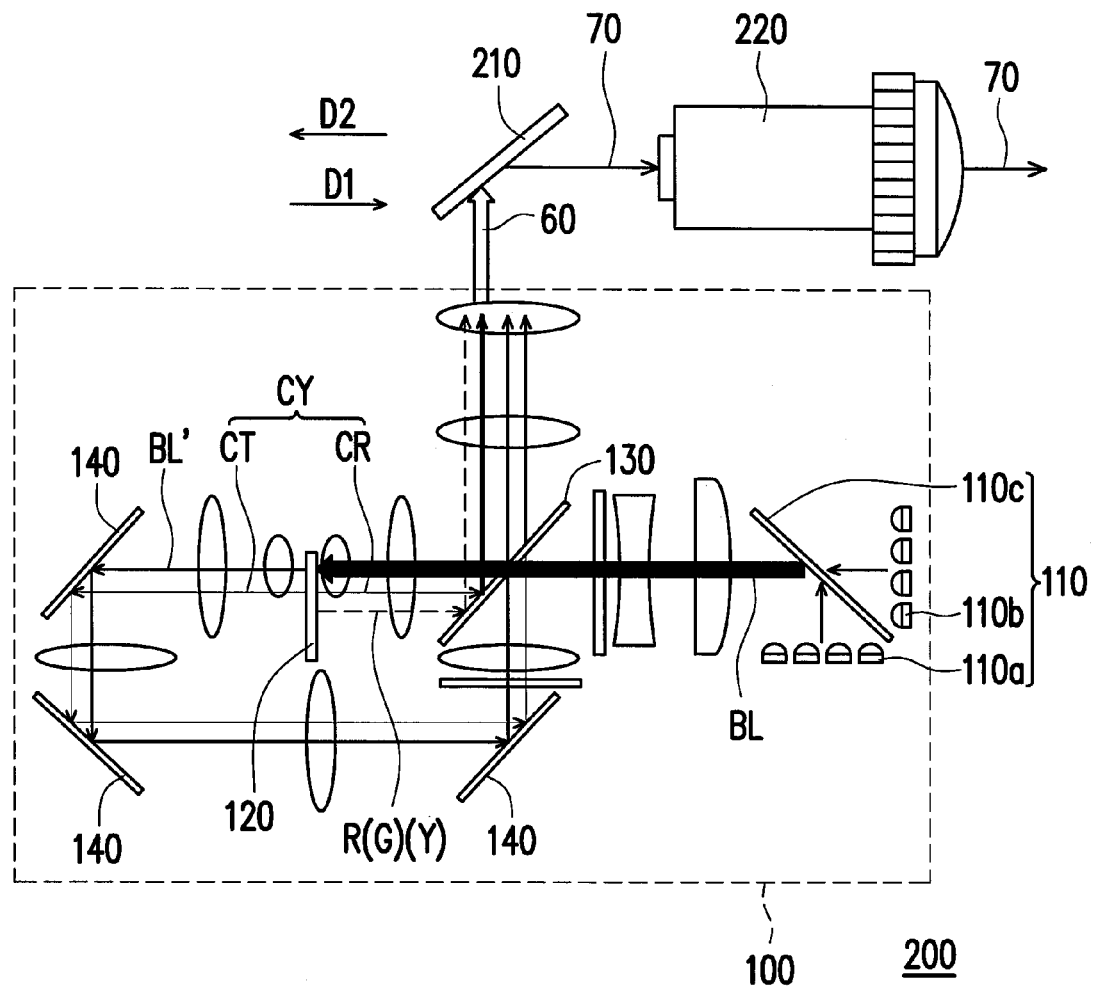
FIG. 1A is a schematic structural diagram illustrating a projection apparatus according to an embodiment of the invention.

FIG. 1A is a schematic structural diagram illustrating a projection apparatus according to an embodiment of the invention. Referring to FIG. 1A, a projection apparatus 200 of the embodiment includes a light source module 100, a light valve 210 and a projection lens 220. Optical elements may be disposed among the light source module 100, the light valve 210 and the projection lens 220 to achieve various effects, such as beam uniformization, convergence of beams, in accordance to the configuration of the designer, and is omitted in the drawings of the embodiment. However, the invention is not intent to limit the existence of the optical elements. To be more specific, in the embodiment, the light source module 100 is configured to provide an illumination light beam 60. The light valve 210 is disposed on a transmission path of the illumination light beam 60 and configured to convert the illumination light beam 60 into an image light beam 70. In the embodiment, the light valve 210 is, for example, a digital micro-mirror device (DMD) or a liquid-crystal-on-silicon LCOS (panel). However, in other embodiments, the light valve 210 may also be a transmissive liquid crystal panel (transmissive LCD) or any other spatial light modulator (SLM). The projection lens 220 is disposed on a transmission path of the image light beam 70 and configured to project the image light beam 70 onto a screen (not shown) to provide an image.

Moreover, in the embodiment, the light source module 100 includes an exciting light source unit 110, a wavelength conversion module 120 and a light combining unit 130. The exciting light source unit 110 is configured to provide an exciting light beam BL. In the embodiment, the exciting light source unit 110 is a laser light source device, and the exciting light beam BL is a laser beam. For instance, the exciting light source unit 110 may be a blue laser diode bank which is a solid-state laser light source, and the exciting light beam BL may be a blue laser beam, but the invention is not limited thereto. In the embodiment illustrated in FIG. 1A, for example, the exciting light source unit 110 may include two blue laser diode banks 110a and 110b and a light combining unit 110c. The light combining unit 110c is a reflector having a plurality of holes to allow laser light emitted by the blue laser diode bank 110a to pass through, and a reflection surface of the reflector reflects laser light emitted by the blue laser diode bank 110b. Thereby, the laser light emitted by the blue laser diode banks 110a and 110b is combined by the light combining unit 110c as the exciting light beam BL. Besides, the light combining unit 130 is disposed on a transmission path of the exciting light beam BL and located between the exciting light source unit 110 and the wavelength conversion module 120. To be specific, the light combining unit 130 is a dichroic mirror or a dichroic prism and may provide different optical effects on light beams of different colors. For instance, in the embodiment, the light combining unit 130 may allow a blue light beam to pass through but reflects light beams of other colors (e.g. red, green and yellow light beams). That is to say, the light combining unit 130 may allow the exciting light beam BL to pass through. Thus, the exciting light beam BL may pass through the light combining unit 130 to be incident to the wavelength conversion module 120.

Figure 1B:
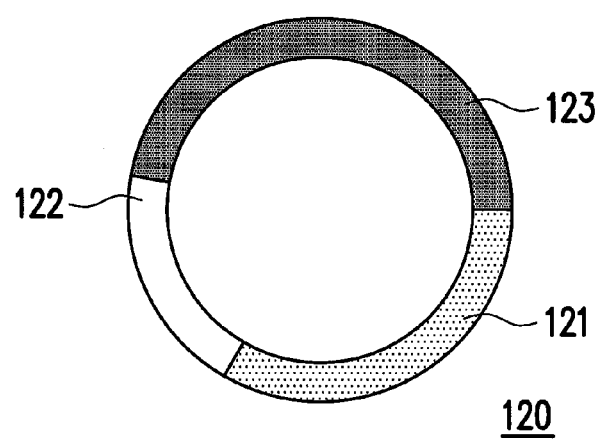
FIG. 1B is a front schematic view illustrating a wavelength conversion module according to an aspect of the embodiment depicted in FIG. 1A.

FIG. 1B is a front schematic view illustrating a wavelength conversion module according to an aspect of the embodiment depicted in FIG. 1A. Referring to FIG. 1B, in the embodiment, the wavelength conversion module 120 includes at least one wavelength conversion reflecting portion 121, 123 and a wavelength conversion transmitting portion 122. Specifically, the wavelength conversion reflecting portions 121 and 123 and the wavelength conversion transmitting portion 122 alternately cut into the transmission path of the exciting light beam BL. In the embodiment, the wavelength conversion module 120 may be, for example, a wavelength conversion wheel or a phosphor wheel, but the invention is not limited thereto. Then, referring again to FIG. 1A, in particular, when the wavelength conversion transmitting portion 122 cuts into the transmission path of the exciting light beam BL, a part of the exciting light beam BL passing through the wavelength conversion transmitting portion 122 is a first color light beam BL', while another part of the exciting light beam BL is converted into a second color light beam CY by the wavelength conversion transmitting portion 122.

A mechanism for forming the first color light beam BL' and the second color light beam CY will be further described in detail with reference to FIG. 2A and FIG. 2B.

Figure 2A:
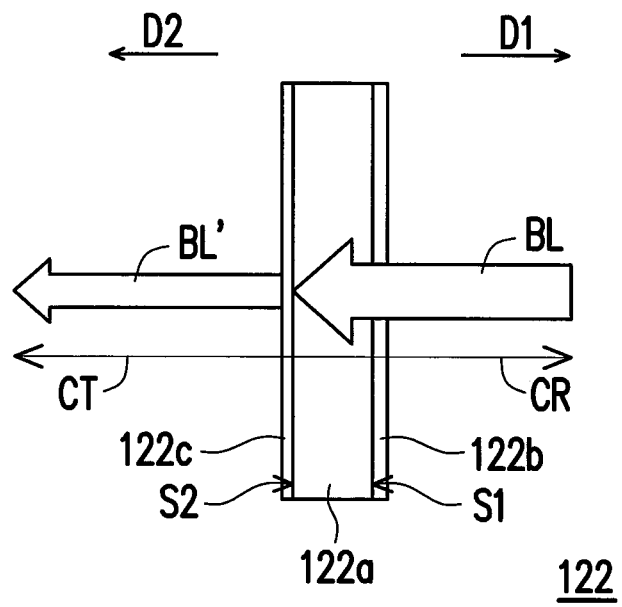
FIG. 2A is a cross-sectional schematic view illustrating a wavelength conversion transmitting portion according to an aspect of the embodiment depicted in FIG. 1A.
Figure 2B:
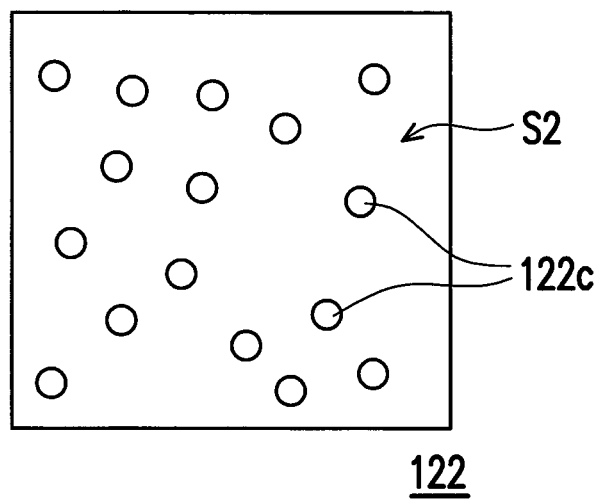
FIG. 2B is a partially front schematic view illustrating a wavelength conversion transmitting portion according to an aspect of the embodiment depicted in FIG. 1A.

FIG. 2A is a cross-sectional schematic view illustrating a wavelength conversion transmitting portion according to an aspect of the embodiment depicted in FIG. 1A. FIG. 2B is a partially front schematic view illustrating a wavelength conversion transmitting portion according to an aspect of the embodiment depicted in FIG. 1A. Referring to FIG. 2A and FIG. 2B, in the embodiment, the wavelength conversion transmitting portion 122 further includes a substrate 122a, an anti-reflection layer 122b and a phosphor layer 122c. To be specific, in the embodiment, the substrate 122a includes a first surface S1 and a second surface S2 that are opposite to each other, and material of the substrate 122a may be for example, glass, plastic or any other adaptive material. Moreover, in the embodiment, the anti-reflection layer 122b is located on the first surface S1, and the phosphor layer 122c is coated on the second surface S2 of the substrate 122a. As shown in FIG. 2B, in the embodiment, material of the phosphor layer 122c is uniformly distributed on the second surface S2, and the material of the phosphor layer 122c may be, for example, cyan phosphor. That is, a cyan light beam is excited after the exciting light beam shoots on the phosphor material, but the invention is not limited thereto.

To be more specific, in the embodiment, the anti-reflection layer 122b may increase a ratio of the exciting light beam BL incident to the substrate 122a and sufficiently shoot on the phosphor layer 122c. As shown in FIG. 2A, at this time, a part of the exciting light beam BL may sequentially pass through the anti-reflection layer 122b, the substrate 122a and the phosphor layer 122c and directly pass through the wavelength conversion transmitting portion 122, without being affected by the wavelength conversion of the phosphor layer 122c. That part of the exciting light beam BL that is not affected by the phosphor layer 122c is the first color light beam BL'. Thus, the first color light beam BL' has the same color as the exciting light beam BL. On the other hand, when the exciting light beam BL passes through the phosphor layer 122c, a part of the exciting light beam BL is converted into the second color light beam CY by the wavelength conversion transmitting portion 122. To be more detailed, with reference to FIG. 1A and FIG. 2A, in the embodiment, the second color light beam CY includes a first sub light beam CR transmitted along a first direction D1 and a second sub light beam CT transmitted along a second direction D2, wherein the first direction D1 is opposite to the second direction D2.

In addition, it is to be mentioned that in the wavelength conversion transmitting portion 122 of the embodiment, the phosphor layer 122c located on the second surface S2 of the substrate 122a is exemplarily illustrated as an example, but the invention is not limited thereto. Another example will be further described with reference to FIG. 2C.

Figure 2C:
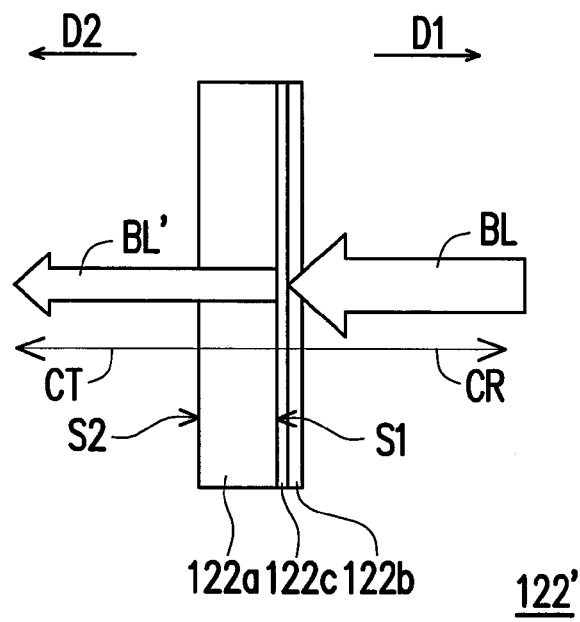
FIG. 2C is a cross-sectional schematic view illustrating a wavelength conversion transmitting portion according to another aspect of the embodiment depicted in FIG. 1A.

FIG. 2C is a cross-sectional schematic view illustrating a wavelength conversion transmitting portion according to another aspect of the embodiment depicted in FIG. 1A. In the embodiment illustrated in FIG. 2C, a phosphor layer 122c of a wavelength conversion transmitting portion 122' may be uniformly distributed on the first surface S1 so as to be located between the anti-reflection layer 122b and the substrate 122a, and the wavelength conversion transmitting portion 122' achieves an effect similar to the wavelength conversion transmitting portion 122 of FIG. 1B, of which the related description may be referred to above and will not be repeated hereinafter.

On the other hand, referring to FIG. 1B again, when cutting into the transmission path of the exciting light beam BL, the wavelength conversion reflecting portion 121 and 123 may convert and reflect the exciting light beam BL into converted reflection light beams R and G. The structure design of the wavelength conversion reflecting portions 121 and 123, and the mechanism for providing the converted reflection light beams R and G will be further described with reference to FIG. 2D.

Figure 2D:
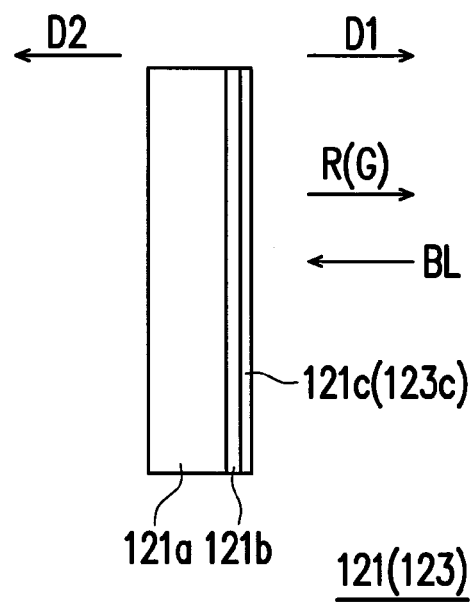
FIG. 2D is a cross-sectional view illustrating the wavelength conversion transmitting portion according an aspect of the embodiment depicted in FIG. 1A.

FIG. 2D is a cross-sectional view illustrating the wavelength conversion reflecting portions according an aspect of the embodiment depicted in FIG. 1A. To be specific, in the embodiment, each of the wavelength conversion reflecting portions 121 and 123 includes a substrate 121a and a reflection portion 121b. Additionally, the wavelength conversion reflecting portions 121 and 123 further includes a phosphor layer 121c and a phosphor layer 123c, respectively. To be more detailed, the reflection portion 121b of the wavelength conversion reflecting portion 121 (or 123) is located between the substrate 121a and the phosphor layer 121c (or 123c). In the embodiment, the substrate 121a may be, for example, a glass substrate, the reflection portion 121b may be, for example, a reflection film, and the phosphor layers 121c and 123c may have different colors from the exciting light beam BL and the second color light beam CY. In other words, in the embodiment, the second color light beam CY, the converted reflection light beam R and the exciting light beam BL have different colors from one another. For instance, the colors of the phosphor layers 121c and 123c may be red and green, respectively. Thus, the wavelength conversion reflecting portions 121 and 123 may be converted into a red converted reflection light beam R and a green converted reflection light beam G in sequence by the phosphor layers 121c and 123c when alternately cutting into the transmission path of the exciting light beam BL. The converted reflection light beams R and G may further be reflected by the reflection portion 121b so as to transmit to the light combining unit 130 along the first direction D1.

By doing so, when the wavelength conversion reflecting portion 121, the wavelength conversion transmitting portion 122 and the wavelength conversion reflecting portion 123 sequentially cut into the transmission path of the exciting light beam BL, the illumination light beam 60 illuminating on the light valve 210 is red, blue and green in sequence. Thus, an image projected by the image light beam 70 which is converted by the light valve 120 may be a color image.

In addition, it is to be mentioned that in the wavelength conversion reflecting portion 121 (or 123) of the embodiment, the reflection portion 121b located between the substrate 121a and the phosphor layer 121c (or 123c) is exemplarily illustrated as an example, but the invention is not limited thereto. In another embodiment that is not illustrated, the substrate 121a of the wavelength conversion reflecting portions 121 and 123 may be, for example, a reflective substrate, and the phosphor layer 121c (or 123c) is uniformly distributed on a reflective surface of the substrate 121a, such that the converted reflection light beams R and G may be reflected by the reflective surface of the substrate 121a and transmitted to the light combining unit 130 along the first direction D1. Therefore, the wavelength conversion reflecting portion 121 (or 123) may still have the same effect without being equipped with the reflection portion 121b.

Referring to FIG. 1A again, in the embodiment, the light combining unit 130 is disposed on transmission paths of the first color light beam BL', the second color light beam CY and the converted reflection light beam R. In the embodiment, the light combining unit 130 is a dichroic mirror or a dichroic prism that allows a blue beam to pass through and reflects the beams of other colors (e.g. red, green and yellow) and thus, may provide different optical effects on the first color light beam BL', the second color light beam CY and the converted reflection light beams R and G that have different colors.

To be more detailed, as shown in FIG. 1A, in the embodiment, after being formed, the first color light beam BL' is transmitted along the second direction D2 and then transmitted to the light combining unit 130 through the light transmitting module 140. In the embodiment, the light transmitting module 140 is operated with a plurality of reflector sets, and the first color light beam BL' of the embodiment is a blue beam, such that the first color light beam BL' may pass through the light combining unit 130.

On the other hand, in the embodiment, each of the first sub light beam CR and the second sub light beam CT of the second color light beam CY has a first band and a second band. In the embodiment, the first band is, for example, a green band, and the second band is, for example, a blue band. In other words, the second color light beam CY of the embodiment is a cyan beam containing a green band and a blue band. That is to say, the first sub light beam CR and the second sub light beam CT are also cyan beams containing the green bands and blue bands. Thus, the light combining unit 130 may provide a light-filtering effect to the second color light beam CY, and beams of different colors may be formed according to different incident conditions so as to then produce different light-mixing effects with the first color light beam BL'.

To be more detailed, when the first sub light beam CR and the second sub light beam CT of the second color light beam CY are respectively transmitted to the light combining unit 130, the light combining unit 130 may combine the first band part of the first sub light beam CR with the first color light beam BL' and combine the second band part of the second sub light beam CT with the first color light beam BL'. For instance, as shown in FIG. 1A, in the embodiment, after the first sub light beam CR of the second color light beam CY is transmitted to the light combining unit 130 along first direction D1, only the green band part of the second color light beam CY may be reflected by the light combining unit 130 and thereafter, combined with the first color light beam BL'. After the second sub light beam CT of the second color light beam CY is transmitted along the second direction D2 and then to the light combining unit 130 through the light transmitting module 140, only the blue band part of the second color light beam CY may pass through the light combining unit 130 and thereafter, be combined with first color light beam BL'.

Moreover, in the embodiment, the color of the second color light beam CY may be modulated through modulating phosphor concentration of the phosphor layer 122c. As a result, different color-mixing ratios may be obtained when the first sub light beam CR and the second sub light beam CT of the second color light beam CY are combined with the first color light beam BL', such that various blue-ray effects required by the light combining unit 130 may be achieved. For instance, in the embodiment, the exciting light beam BL emitted by the blue laser diode banks 110a and 110b of the exciting light source unit 110 is more oriented toward to the purple color in the color coordinates. However, after controlling a brightness ratio of the first sub light beam CR to the second sub light beam CT of the second color light beam CY through modulating phosphor concentration of the phosphor layer 122c, a ratio of the first color light beam BL', the first band part of the first sub light beam CR and the second band part of the second sub light beam CT combined by the light combining unit 130 may also be modulated. In other words, the first sub light beam CR and the second sub light beam CT of the second color light beam CY have different ratios of the green band to the blue band when passing through the light combining unit 130. By doing so, a modulation effect of pure blue light may be achieved, such that a color effect entirely presented by the beam formed by combining the first color light beam BL', the first sub light beam CR and the second sub light beam CT may be approximate to or become the blue light effect in the color coordinates commonly used in the display field.

On the other hand, as shown in FIG. 1A, the converted reflection light beams R and G may also be reflected by the light combining unit 130 when passing through the light combining unit 130. The light combining unit 130 may further combine the first color light beam BL', the second color light beam CY and the converted reflection light beams R and G as the illumination light beam 60 and allow the illumination light beam 60 to a color as required. Thus, in the embodiment, by means of the wavelength conversion module 120 with the light combining unit 130, the light source module 100 and the projection apparatus 200 may convert a part of the exciting light beam BL into the second color light beam CY, and the light combining unit 130 may combine the first color light beam BL' with the second color light beam CY, such that the first color light beam BL' and the second color light beam CY as mixed as a beam having a color suitable for usage demand and achieve a modulation effect of pure color. Accordingly, the light source module 100 may have a good spectrum, and the projection apparatus 200 may have a projected image with favorable color performance.

It is to be mentioned that in the above, the light combining unit 130 is exemplarily described as a dichroic mirror or a dichroic prism allowing the blue beam to pass through and reflecting the beams of other colors (e.g. red, green and yellow) for example, but the invention is not limited thereto. In other embodiments, the light combining unit 130 may also be a dichroic mirror or a dichroic prism reflecting the blue beam and allowing the beams of other colors (e.g. red, green and yellow) to pass through. The persons with ordinary skills in the art may configure a proper optical design of the first color light beam BL', the second color light beam CY and the converted reflection light beams R and G according to actual requirements so as to achieve the similar light-combining effect of the light combining unit 130, which will not be repeated hereinafter.

In addition, it is also to be mentioned that the aforementioned wavelength conversion module 120 is exemplarily described as a combination of the wavelength conversion reflecting portions 121 and 123 and the wavelength conversion transmitting portion 122 for example, but the invention is not limited thereto. In other embodiments, the wavelength conversion module 120 may also be another type of a wavelength conversion reflecting portion that is combined with a wavelength conversion transmitting portion, which will be further described with reference to FIG. 3 and FIG. 4.

Figure 3:
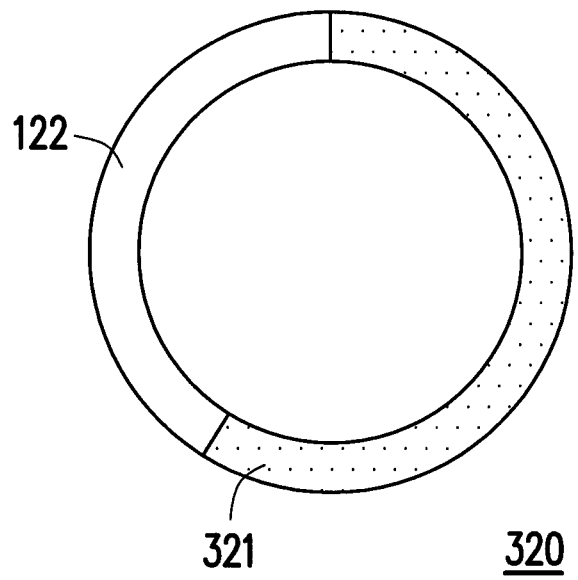
FIG. 3 is a front schematic view illustrating a wavelength conversion module according to another aspect of the embodiment depicted in FIG. 1A.

FIG. 3 is a front schematic view illustrating a wavelength conversion module according to another aspect of the embodiment depicted in FIG. 1A. In the embodiment illustrated in FIG. 3, a wavelength conversion reflecting portion 321 of a wavelength conversion module 320 may have a phosphor layer with a color different from the exciting light beam BL and the second color light beam CY. For instance, the wavelength conversion reflecting portion 321 has a yellow phosphor layer. Thus, when the wavelength conversion reflecting portion 321 cuts into the transmission path of the exciting light beam BL, the wavelength conversion reflecting portion 321 may convert and reflect the exciting light beam BL into at least one converted reflection light beam Y of which a color is yellow. In other words, in the embodiment, the second color light beam CY, the converted reflection light beam R and the exciting light beam BL have different colors from one another. Thus, as shown in FIG. 1A, when being transmitted to the light combining unit 130 (the light combining unit 130 of the embodiment may also reflect the yellow light beam), the converted reflection light beam Y may further be reflected by the light combining unit 130 and combined with the first color light beam BL' and the second color light beam CY to present proper color effects after color mixing.

Figure 4:
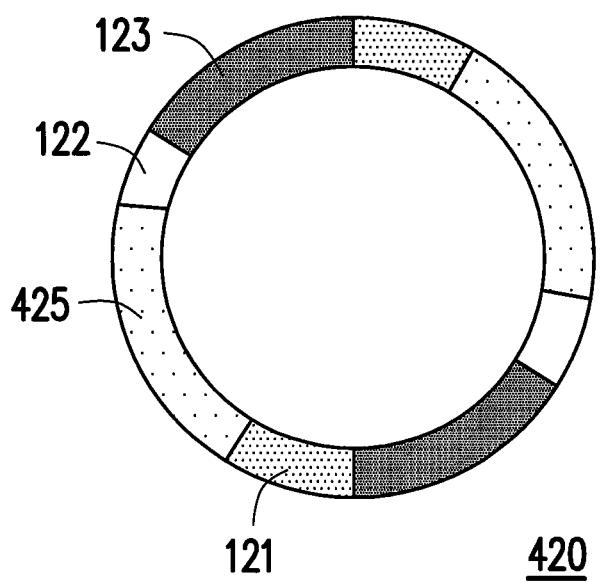
FIG. 4 is a front schematic view illustrating a wavelength conversion module according to still another aspect of the embodiment depicted in FIG. 1A.

FIG. 4 is a front schematic view illustrating a wavelength conversion module according to still another aspect of the embodiment depicted in FIG. 1A. In the embodiment illustrated in FIG. 4, at least one wavelength conversion reflecting portion 121 of a wavelength conversion module 420 are a plurality of wavelength conversion reflecting portions 121, 123 and 425, and the wavelength conversion transmitting portion 122 and the wavelength conversion reflecting portions 121, 123 and 425 alternately cut into the transmission path of the exciting light beam BL. At least part of the converted reflection light beams R, G and Y, converted and reflected from the exciting light beam BL respectively by the wavelength conversion reflecting portions 121, 123 and 425, have different colors. For instance, in the embodiment, since the wavelength conversion reflecting portions 121 and 123 respectively have a red phosphor layer and a green phosphor layer, a red and a green converted reflection light beams R and G may be respectively formed. On the other hand, the wavelength conversion reflecting portion 425 may have, for example, a yellow phosphor layer, and thus, the wavelength conversion reflecting portion 425 may further convert and the reflect the exciting light beam BL into a yellow converted reflection light beam Y. Thus, as shown in FIG. 1A, the converted reflection light beams R, G and Y may further be reflected by the light combining unit 130 and combined with the first color light beam BL' and the second color light beam CY when being transmitted to the light combining unit 130.

In this way, when the wavelength conversion reflecting portions 121 and 123, the wavelength conversion transmitting portion 122 and the wavelength conversion reflecting portion 425 sequentially cut into the transmission path of the exciting light beam BL, the illumination light beam 60 illuminating on the light valve 210 is red, green, blue and yellow in sequence. Thus, an image projected by the image light beam 70 which is converted by the light valve 120 may be a color image.

Moreover, it is also to be mentioned that the wavelength conversion transmitting portion 122 further includes a plurality of scattering microstructures to eliminate a laser speckle phenomenon of the projection apparatus 200. A possible variation of the wavelength conversion transmitting portion 122 will be further described with reference to FIG. 5 and FIG. 6.

Figure 5:
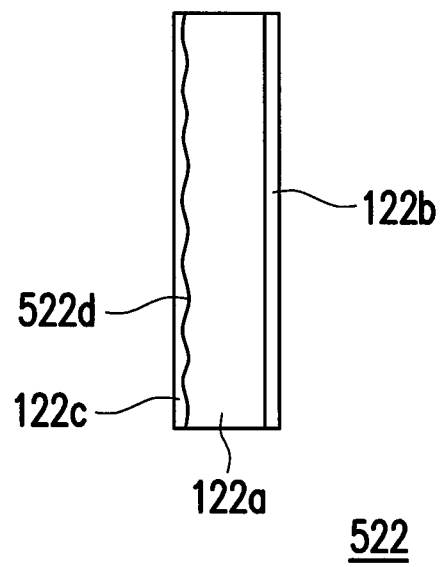
FIG. 5 is a cross-sectional schematic view illustrating a wavelength conversion transmitting portion according to another aspect of the embodiment depicted in FIG. 1A.
Figure 6:
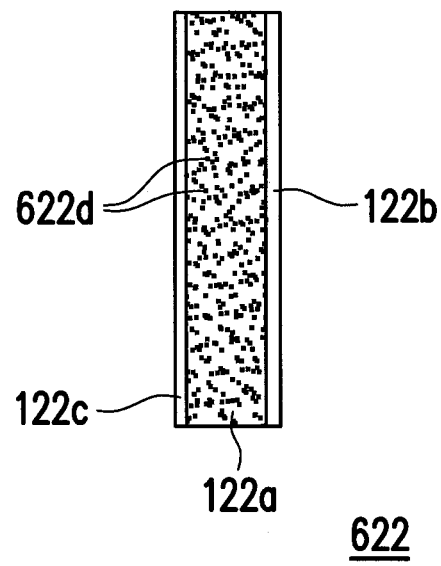
FIG. 6 is a cross-sectional schematic view illustrating a wavelength conversion transmitting portion according to still another aspect of the embodiment depicted in FIG. 1A.

FIG. 5 is a cross-sectional schematic view illustrating a wavelength conversion transmitting portion according to another aspect of the embodiment depicted in FIG. 1A. FIG. 6 is a cross-sectional schematic view illustrating a wavelength conversion transmitting portion according to still another aspect of the embodiment depicted in FIG. 1A. Referring to FIG. 5 and FIG. 6, a wavelength conversion transmitting portion 522 illustrated in FIG. 5 and a wavelength conversion transmitting portion 622 illustrated in FIG. 6 are similar to the wavelength conversion transmitting portion 122 illustrated in FIG. 1A, among which the difference will be described as follows. The wavelength conversion transmitting portion 522 illustrated in FIG. 5 and the wavelength conversion transmitting portion 622 illustrated in FIG. 6 respectively have a plurality of scattering microstructures 522d and 622d. In the embodiment depicted in FIG. 5, the scattering microstructures 522d of the wavelength conversion transmitting portion 522 are located between the substrate 122a and the phosphor layer 122c. In other words, the scattering microstructures 522d are distributed, for example, on the second surface S2 of the substrate 122a, and the phosphor layer 122c covers the scattering microstructures 522d so as to scatter the exciting light beam BL. On the other hand, in the embodiment depicted in FIG. 6, the scattering microstructures 622d of the wavelength conversion transmitting portion 622 are distributed inside the substrate 122a so as to scatter the exciting light beam BL. Based on the configurations of the plurality of scattering microstructures 522d of the wavelength conversion transmitting portion 522 illustrated in FIG. 5 and the plurality of scattering microstructures 622d of the wavelength conversion transmitting portion 622 illustrated in FIG. 6, the exciting light beam BL may be uniformly scattered when passing through the wavelength conversion transmitting portion 522 and 622 so as to mitigate the laser speckle phenomenon.

Moreover, in the embodiment, since the wavelength conversion transmitting portion 522, the wavelength conversion transmitting portion 622 and the wavelength conversion transmitting portion 122 have similar structures, the wavelength conversion transmitting portion 522 and the wavelength conversion transmitting portion 622 also have the same effects and advantages as described with respect to the wavelength conversion transmitting portion 122, which will not be repeatedly described hereinafter.

In light of the foregoing the light source module and the projection apparatus according to the embodiments of the invention may convert a part of the exciting light beam into the second color light beam, and the light combining unit combines the first color light beam with the second color light beam, by means of the wavelength conversion module operating with the light combining unit. So, the first color light beam and the second color light beam are mixed as a beam having a color that is more suitable for usage demands so as to a modulation effect of pure color. Thus, the problem of less selectable bands resulted from laser monochrome may be resolved. Accordingly, the light source module provided by the embodiments of the invention may have a good spectrum and the projection apparatus provided by the embodiments of the present invention may have a projected image with favorable color performance.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims.

Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module, comprising:
an exciting light source unit, providing an exciting light beam;
a wavelength conversion module; comprising:
at least one wavelength conversion reflecting portion; and
a wavelength conversion transmitting portion, wherein the wavelength conversion transmitting portion comprises a phosphor layer, the at least one wavelength conversion reflecting portion and the wavelength conversion transmitting portion alternately cut into a transmission path of the exciting light beam, and when the wavelength conversion transmitting portion cuts into the transmission path of the exciting light beam, a part of the exciting light beam passing through the wavelength conversion transmitting portion is a first color light beam, and another part of the exciting light beam is converted into a second color light beam by the phosphor layer of the wavelength conversion transmitting portion, and when the at least one wavelength conversion reflecting portion cuts into the transmission path of the exciting light beam, the at least one wavelength conversion reflecting portion converts and reflects the exciting beam into at least one converted reflection light beam, and the second color light beam, the converted reflection light beam and the exciting light beam have different colors from one another; and
a light combining unit, wherein the light combining unit is disposed on transmission paths of the first color light beam, the second color light beam and the converted reflection light beam and combines the first color light beam, the second color light beam and the converted reflection light beam as an illumination light beam.

2. The light source module according to claim 1, wherein the wavelength conversion transmitting portion further comprises:
a substrate, comprising a first surface and a second surface that are opposite to each other; and
an anti-reflection layer, located on the first surface,
wherein the phosphor layer is coated on the second surface of the substrate, and a part of the exciting light beam sequentially passes through the anti-reflection layer, the substrate and the phosphor layer.

3. The light source module according to claim 2, wherein the wavelength conversion transmitting portion further comprises a plurality of scattering microstructures located between the substrate and the phosphor layer.

4. The light source module according to claim 2, wherein the wavelength conversion transmitting portion further comprises a plurality of scattering microstructures distributed inside the substrate.

5. The light source module according to claim 1, wherein the light combining unit is further disposed on the transmission path of the exciting light beam and located between the exciting light source unit and the wavelength conversion module.

6. The light source module according to claim 5, wherein the second color beam comprises a first sub light beam and a second sub light beam, wherein the first sub light beam is transmitted to the light combining unit along a first direction, the second sub light beam is transmitted along a second direction and then transmitted to the light combining unit through a light transmitting module, and the first direction is opposite to the second direction.

7. The light source module according to claim 6, wherein each of the first sub light beam and the second sub light beam has a first band and a second band, and the light combining unit combines the first band part of the first sub light beam with the first color light beam and combines the second band part of the second sub light beam with the first color light beam.

8. The light source module according to claim 1, wherein the light combining unit is a dichroic mirror or a dichroic prism.

9. The light source module according to claim 1, wherein the at least one wavelength conversion reflecting portion are a plurality of wavelength conversion reflecting portions, the wavelength conversion transmitting portion and the plurality of wavelength conversion reflecting portions alternately cut into the transmission path of the exciting light beam, and at least part of converted reflection light beams that are respectively converted and reflected from the exciting light beam by the wavelength conversion reflecting portions have different colors.

10. The light source module according to claim 1, wherein the exciting light source unit is a laser light source, and the exciting light beam is a laser beam.

11. A projection apparatus, comprising:
a light source module, comprising:
an exciting light source unit, providing an exciting light beam;
a wavelength conversion module; comprising:
at least one wavelength conversion reflecting portion; and
a wavelength conversion transmitting portion, wherein the wavelength conversion transmitting portion comprises a phosphor layer, the at least one wavelength conversion reflecting portion and the wavelength conversion transmitting portion alternately cut into a transmission path of the exciting light beam, and when the wavelength conversion transmitting portion cuts into the transmission path of the exciting light beam, a part of the exciting light beam passing through the wavelength conversion transmitting portion is a first color light beam, and another part of the exciting light beam is converted into a second color light beam by the phosphor layer of the wavelength conversion transmitting portion, and when the at least one wavelength conversion reflecting portion cuts into the transmission path of the exciting light beam, the at least one wavelength conversion reflecting portion converts and reflects the exciting light beam into at least one converted reflection light beam, and the second color light beam, the converted reflection light beam and the exciting light beam have different colors from one another; and
a light combining unit, wherein the light combining unit is disposed on transmission paths of the first color light beam, the second color light beam and the converted reflection light beam and combines the first color light beam, the second color light beam and the converted reflection light beam as an illumination light beam; and
a light valve, disposed on a transmission path of the illumination light beam and configured to convert the illumination light beam into an image light beam; and
a projection lens, disposed on a transmission path of the image light beam.

12. The projection apparatus according to claim 11, wherein the wavelength conversion transmitting portion further comprises:
a substrate, comprising a first surface and a second surface that are opposite to each other; and
an anti-reflection layer, located on the first surface,
wherein the phosphor layer is coated on the second surface of the substrate, and a part of the exciting light beam sequentially passes through the anti-reflection layer, the substrate and the phosphor layer.

13. The projection apparatus according to claim 12, wherein the wavelength conversion transmitting portion further comprises a plurality of scattering microstructures located between the substrate and the phosphor layer.

14. The projection apparatus according to claim 12, wherein the wavelength conversion transmitting portion further comprises a plurality of scattering microstructures distributed inside the substrate.

15. The projection apparatus according to claim 11, wherein the light combining unit is further disposed on the transmission path of the exciting light beam and located between the exciting light source unit and the wavelength conversion module.

16. The projection apparatus according to claim 15, wherein the second color light beam comprises a first sub light beam and a second sub light beam, wherein the first sub light beam is transmitted to the light combining unit along a first direction, the second sub light beam is transmitted along a second direction and then transmitted to the light combining unit through a light transmitting module, and the first direction is opposite to the second direction.

17. The projection apparatus according to claim 16, wherein each of the first sub light beam and the second sub light beam has a first band and a second band, and the light combining unit combines the first band part of the first sub light beam with the first color light beam and combines the second band part of the second sub light beam with the first color light beam.

18. The projection apparatus according to claim 11, wherein the light combining unit is a dichroic mirror or a dichroic prism.

19. The projection apparatus according to claim 11, wherein the at least one wavelength conversion reflecting portion are a plurality of wavelength conversion reflecting portions, the wavelength conversion transmitting portion and the plurality of wavelength conversion reflecting portions alternately cut into the transmission path of the exciting light beam, and at least part of converted reflection light beams that are respectively converted and reflected from the exciting light beam by the wavelength conversion reflecting portions have different colors.

20. The projection apparatus according to claim 11, wherein the exciting light source unit is a laser light source, and the exciting light beam is a laser beam.

* * * * *